Feb. 12, 1935.  B. W. FREEMAN  1,990,598
ORNAMENTING MACHINE
Filed July 11, 1933  7 Sheets-Sheet 1

Fig. 1.

INVENTOR
Benjamin W. Freeman,
BY Riordan & Riordan
ATTORNEY

Fig. 2.

Feb. 12, 1935.  B. W. FREEMAN  1,990,598
ORNAMENTING MACHINE
Filed July 11, 1933  7 Sheets-Sheet 4

INVENTOR
Benjamin W. Freeman,
BY Riordan & Riordan
ATTORNEY

Feb. 12, 1935.  B. W. FREEMAN  1,990,598
ORNAMENTING MACHINE
Filed July 11, 1933   7 Sheets-Sheet 6

INVENTOR
Benjamin W. Freeman
BY
Riordon & Riordon
ATTORNEY

Patented Feb. 12, 1935

1,990,598

UNITED STATES PATENT OFFICE 1,990,598

ORNAMENTING MACHINE

Benjamin W. Freeman, Cincinnati, Ohio

Application July 11, 1933, Serial No. 679,962

35 Claims. (Cl. 101—316)

This invention relates to shoe ornamenting machines and more particularly to improvements in combined marking and cutting machines of the type described in my copending applications Serial No. 563,429, filed September 17th, 1931, and Serial No. 624,835, filed July 26th, 1932.

Such machines are particularly adapted for operations upon skins, upper blanks, fitted and closed uppers or the like in which the work is marked with an ink or pigment (as distinguished from impression or indentation marking), at the same time or as part of a continuous cycle of operations during which the work is ornamented by perforating or cutting out a design therein.

Machines of this nature usually include a work support carrying suitable gauges for aligning the work thereon, and such support may be of anvil-like configuration or may be in the form of a table which is movable with respect to a main supporting member located therebeneath, or may include a combination of both, whereby removal of the table will permit use of the anvil type support.

Marking and cutting dies are provided, such dies being detachably supported in the machine, and mechanism providing a relative movement between the work support and dies is also utilized.

These machines comprise generally a base having an upstanding frame secured thereto to support an overhanging head beneath which is arranged the work table or support, which is movable, relatively speaking from an operative position beneath the head to an inoperative position where the work may be placed on the table there being a plunger reciprocable in the head toward and from the work and to which the die is attached. As a variation, the die may be fixed and the work support movable into and out of ornamenting relation therewith.

The die engaging portion of the work support or work table support is generally surfaced with a soft material such as brass to prevent dulling of the cutting edges of the die when same pierces the work, and there is usually fed a strip of paper or equivalent backing material over the top of this relatively soft surface to insure a clean cut as the die passes through the work.

It is understood, of course, that the work is supported over the paper and that the paper will be automatically fed with an intermittent motion after each reciprocation of the die, thereby to insure a fresh surface.

Operation of a machine is usually initiated by means of a treadle controlled clutch which may be of the single revolution type designed to apply power to the working parts of the machine, such working parts including connections to the table as well as to the plunger carrying the dies. When the machine is treadled, the work table is moved into alignment with the dies, and when in proper position the dies descend, marking and cutting the work, and then return to an inoperative position, the table moving to a position where the work may be removed and fresh work inserted.

Various safety means are provided which prevent actuation of the plunger when the table is in its inoperative or work positioning location, and to insure a predetermined cycle of operations designed to avoid injury to an operator, to the machine, or to the work by preventing premature movement of any parts.

Among the improvements forming features of this invention are an improved drive mechanism for the plunger, a novel and improved paper feed mechanism, utilization of a novel inking mechanism in which the ink roll is positively driven to provide a surface or peripheral movement, whereby a rolling contact between the marking die and the ink roll is obtained, and all sliding contact avoided.

A further object of the present invention includes an improved mounting of the ink applying roll or equivalent arrangement, on the work table, and improved operation thereof. Not only it is contemplated that the roll will be power driven in synchronism with movements of the table, but it has been found desirable to vary the speed of the table, such that as the table moves toward an ornamenting position, the motion thereof is relatively slow to accommodate inking of the die, but when the table returns to its original position, and no inking is required, the speed thereof is increased, and at the same time the ink roll is depressed so that it will not contact with the die.

It frequently happens with certain materials that the marking medium will be improperly or unevenly distributed over the inking roll and means are provided for insuring an adequate and proper distribution of such material on the roll of the present invention.

Various novel methods of and mechanisms for supporting the dies and for mounting the markers form an important part of this invention. Other features include the provision of mechanism for removing cutout chips which might fall on the backing paper or striking surface of the machine, thus avoiding irregularities of cut such as would occur if the chips happened to fall in line with any portions of the marking or cutting elements.

To the attainment of the above and other objects which will appear as the description proceeds, reference may be made to the accompanying drawings, in which:—

Figure 1:
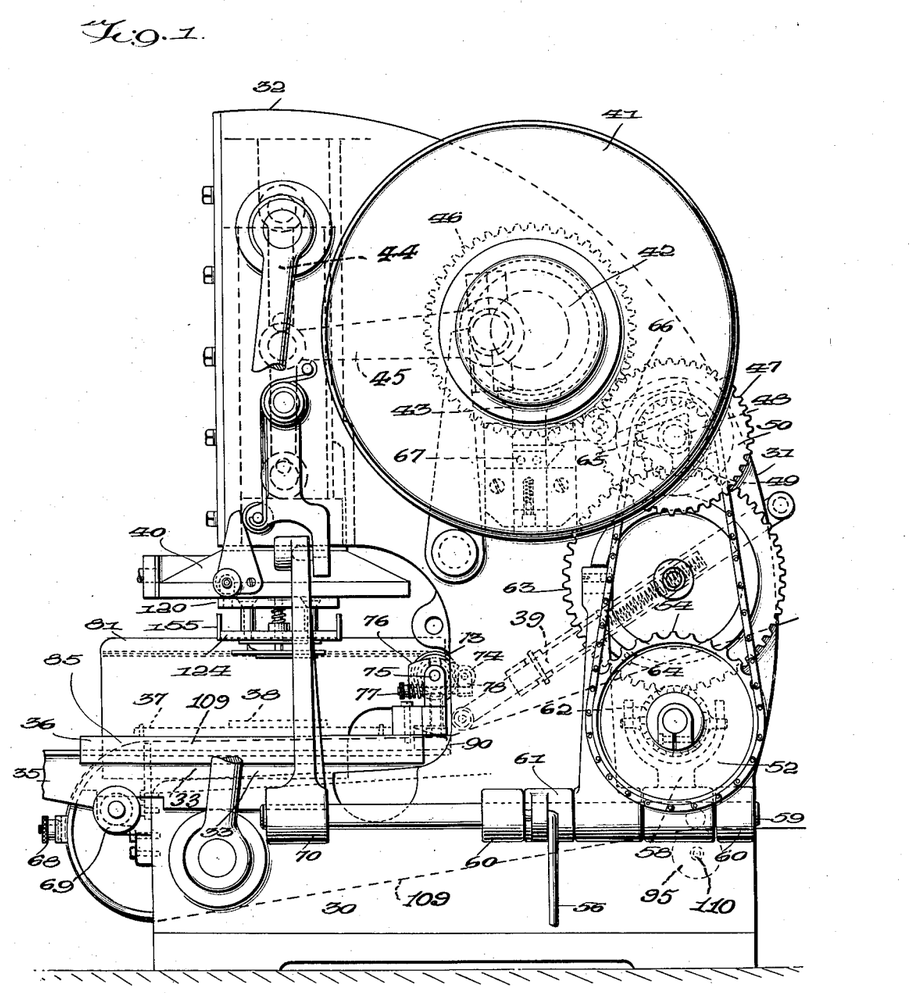
Fig. 1 is a side elevation of an assembled machine.
Figure 2:
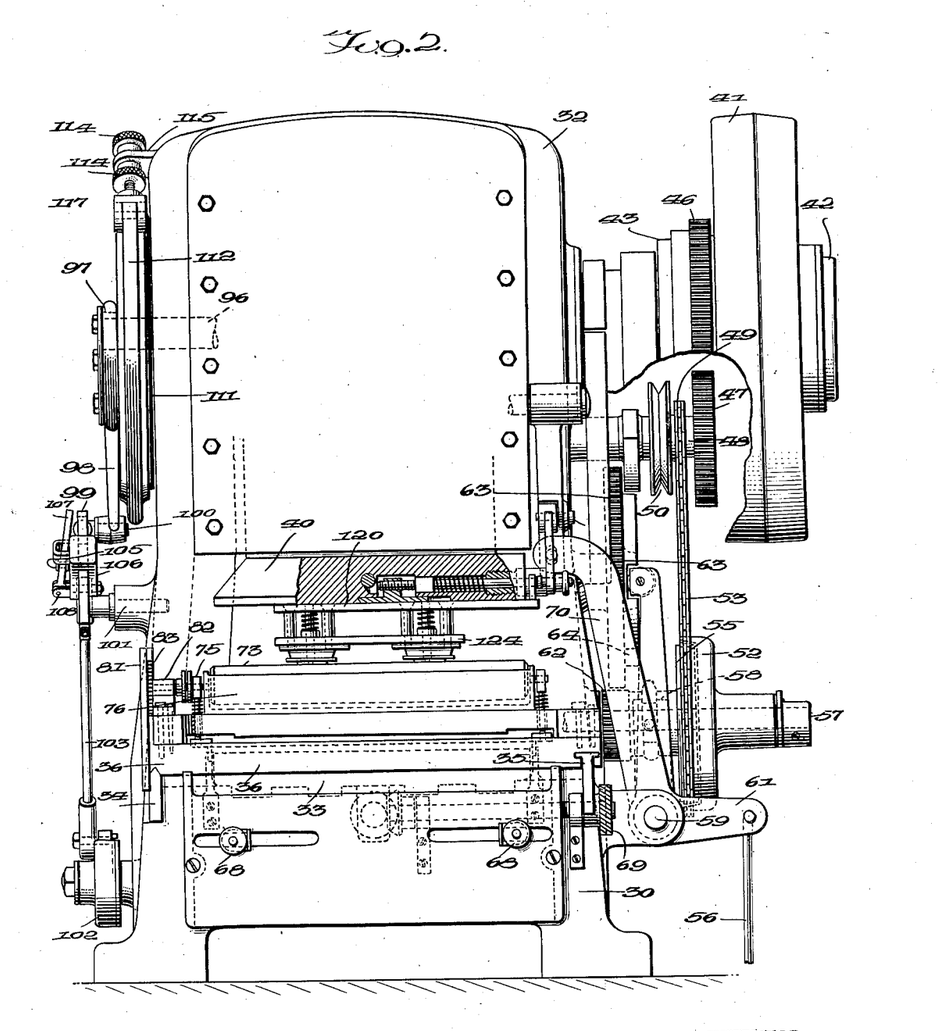
Fig. 2 is a front elevation thereof, partly in section.
Figure 3:
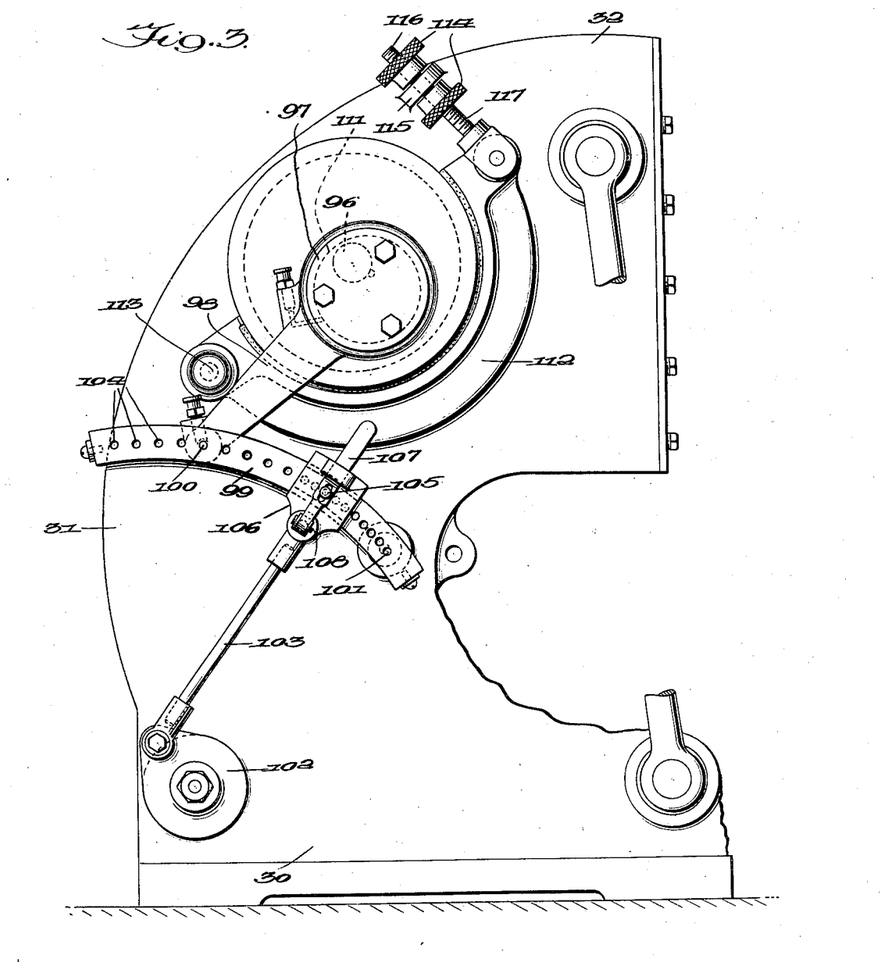
Fig. 3 is a side elevation looking at the opposite side from Fig. 1 and illustrating the paper feeding mechanism and the improved brake for the machine.
Figure 4:
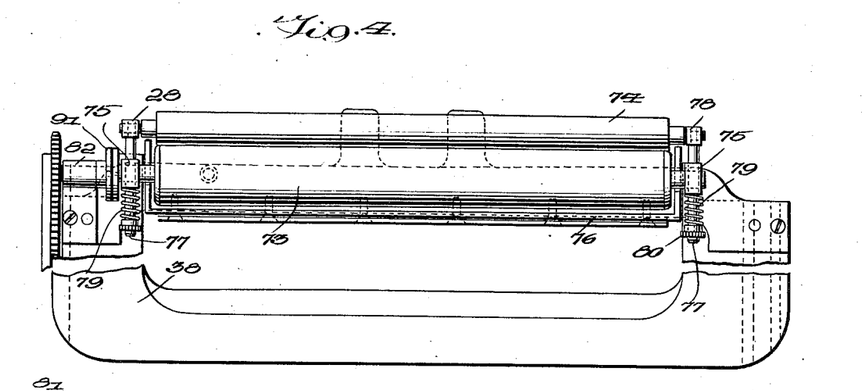
Fig. 4 is a plan view, somewhat enlarged, of the ink applying mechanism, portions of the work table being broken away.

Referring more specifically to the drawings in which like reference numerals designate like parts, and particularly to Figs. 1 to 3 it will be seen that the machine comprises generally a base 30, having an upwardly extending frame or casing 31 which terminates in a head portion 32, overhanging the front part of the base to provide an enclosure or throat within which is mounted a work and work table support indicated generally at 33. Secured to the frame and extending from the support are guides 34 and 35 of which 34 is provided with a V-shaped upper surface, and 35 with a T-shaped upper surface. Mounted over the support 33, and for sliding movement on the guides is a work table or carriage 36 which carries a work positioning plate 37 supporting a work locating gauge or abutment 38. A plunger 40 is mounted in the head 32 for vertical reciprocating movement into and out of ornamenting relation to the work.

Power for actuating the various parts of the machine is applied to a pulley or fly-wheel 41 which is freely mounted for continuous rotation on a main drive shaft 42 extending transversely of the frame 31, and a clutching mechanism indicated generally at 43 is provided for connecting and disconnecting the pulley and shaft.

The connections for driving the table include a gear 46 attached to the hub of the pulley or flywheel 41 and another gear 47 which meshes with the gear 46. The gear 47 is freely mounted on a shaft 48 and idles thereon.

The gear 47 is made rigid with a sprocket wheel 49 and a grooved pulley 50. The pulley 50 is arranged for connection to a paper rewind shaft in the paper feed mechanism hereinafter described, by a round belt (not shown). The sprocket 49 is connected to a friction clutch 52 by a chain 53, which meshes with a sprocket 54, formed on the outer casing of the clutch. As the pulley 41 is running continuously, the gears 46 and 47, the pulley 50, the sprockets 49 and 54 and the chain are also running continuously.

This friction clutch (Fig. 2) comprises the constantly driven outer drum having the sprocket 54, and an inner drum 55 which is normally stationary, but is splined to a shaft 57 for movement axially by a treadle rod 56 and connections therefrom into engagement with the outer revolving drum and sprocket 54, for rotation thereby, the latter drum turning freely on the shaft 57, which rotates however under the influence of drum 55. The connections from the treadle rod 56 to the drum 55 comprise a lever or yoke 58, which is keyed to a shaft 59 rotatably mounted in two extending bosses 60 and to which shaft is also pinned a treadle lever 61.

Suitable gearing and telescopic connections of the type disclosed in my aforesaid applications and designated generally at 39, connect the inner drum 55 to the table 36 whereby same may be reciprocated, as power is applied by engagement of the clutch drums with each other.

Mounted on the shaft 57 is a smaller gear 62 meshing with a larger gear 63 mounted on the frame. This gear 63 carries an adjustable dog 64, the purpose of which is to actuate and control a release mechanism for the main clutch 43, whereupon such clutch will be actuated and the plunger driving mechanism brought into operation in synchronized relation to the table driving mechanism. This release mechanism includes two levers, one shaped as a bell crank 65 carried by the spindle or shaft 48 and having an arm positioned in the normal path of the dog 64. The other arm is positioned to engage one end of a lever 66 pivoted intermediate its ends on the frame 31, and having its other end normally engaging a clutch latch 67. Upon actuation of the lever 66 to release the clutch latch 67 the clutching mechanism 43 will be actuated to connect the fly wheel 41 to the shaft 42, thereby applying power to the plunger driving mechanism. This mechanism includes a crank and lever movement illustrated diagrammatically at 44 and 45 in Fig. 1, between the shaft 42 and plunger 40, the details thereof and of the clutch arrangement being more fully disclosed in my copending applications above noted.

The support 33, while normally rigid in the machine is removable therefrom and adjustable therein, such adjusting mechanism being indicated generally at 69.

Various means are provided for preventing actuation of the plunger at such time as the table is out of the exact position necessary for a proper ornamentation of the work. These means and mechanism are essentially the same as disclosed and described in application, Serial No. 624,835, a lever 70, mounted on the shaft 59, forming a direct control therefor. This lever obviously, will be positioned in accordance with positions of the treadle 56, as it is pinned to shaft 59, and thus will control the safety mechanism directly in accordance therewith.

The inking mechanism, for applying ink to marking elements of the dies, includes a spring mounted ink roll 73 carried by the table in a position such as to contact the markers as the table reciprocates. While it is within the scope of this invention to utilize a freely rotatable ink roll, rotatable through frictional engagement with the markers, and contacting same on both the inward and outward movements of the table, nevertheless a preferred form contemplates an ink roll which is positively driven, with a surface or peripheral movement exactly the same as the table movement. As a consequence the roll contacts with the marking elements of the die with a rolling action rather than with a wiping or sliding contact. Means are provided for lowering or depressing the ink roll so that it does not contact with the marking elements of the die as the table moves out of its ornamenting position, and accordingly it is possible to speed up such movement, to a rate greater than that possible when the table is moving into ornamenting position.

This arrangement affords several advantages. Slippage between the ink roll and the die upon initial contact therebetween, which would result in supplying too much ink to the first elements which contact the die, is avoided. The same thing, which might happen on return movement of the ink roll, and to a greater degree, as the return movement of the table is faster, is likewise avoided, by depression of the roll. Incidentally there is no necessity for inking in both directions, as there is a time element intervening after the outward table movement, during which time the work is removed and other work placed on the gauge plate. During this period the ink applied to the marking elements on the outward or return movement, tends to dry and clog up the marking elements, particularly when a quick drying, marking material is used, as is customary.

The ink roll 73 is preferably made of sponge rubber, but could be made of other absorbent material such as felt or equivalent material. Experiments with a number of different materials has shown, however, that sponge rubber of a certain texture or density gives effective results, and preferably the surface of the roll is somewhat porous and effective to absorb the ink.

When ink is applied to the ink roll a certain amount is worked under the outer surface and in order to eliminate the necessity of inking too often, there is provided a supplementary pressure or distributing roll 74. This roll 74 acts to maintain a uniform amount of ink on the surface of the roll 73, as it has a tendency to squeeze ink from within or under the surface of the roll 73, to the surface, as needed. When the roll 73 is initially supplied with ink, a surplus is provided which feeds between the two rolls, and when the table moves in, the ink roll 73 rotates slightly before it starts inking and by that time, the surface is cleared of the surplus ink, so that the marking elements of the die will be properly inked.

Preferably the distributing roll is made with a non-porous surface, but it is contemplated that conditions may arise in which the supplementary roll 74 will be utilized with a porous surface similar to that of the ink roll.

The amount of ink that will be applied to the marking elements can be regulated by adjustment of the auxiliary or supplemental roll 74, which is spring mounted to permit adjustment of the tension. This adjustment is important inasmuch as shoe factories use different types of materials to be marked, requiring different amounts of ink in marking. The present mechanism permits continuous marking until substantially all of the marking material initially applied to the ink roll has been used up.

The roll 73 is carried at the rear or inner edge of the table 36 by resiliently mounted or spring pressed brackets 75, from which depend headed studs 71 extending into suitable guides in the table, encircled by springs 72 positioned to space the respective brackets 75 from the surface of the table, within a fixed enclosure or trough 76, which extends substantially the length of the roll to prevent air from drying out the roll or possible spattering of ink. Extending transversely of the supporting brackets 75 respectively are studs 77 each carrying at one end a bracket 78 supporting the roll 74. Springs 79 are interposed between the brackets 75 and the other end of the stud 77 whereby the roll 74 is yieldingly pressed against the roll 73. This pressure may be varied by adjustment of the thumb screws 80, to decrease or increase compression of the spring 79.

Fixed to the support 33, is a panel or rack plate 81 which extends substantially the length of the path of table travel. A stub shaft 82 is mounted on the table 36, in axial alignment with the roll 73, and carries the gear 83 which is positioned to mesh with the rack 81, said stub shaft being clutched or coupled to the roll. As the table reciprocates the rack and gear effect a positive rotation of the roll 73.

Figure 6:
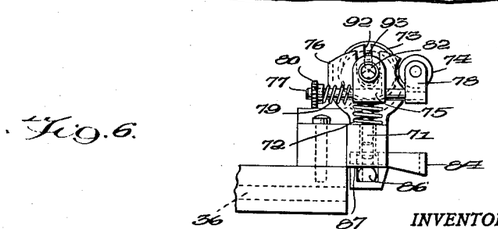
Fig. 6 is an end elevation showing details of the inking mechanism.

Means are provided for raising and lowering the roll, as the respective ends of the path of table travel, as best shown in Fig. 6. A slidable wedge block 84 is placed at each end of the roll, in camming relation to the head of the stud 71, which head is shaped as a cam roll or abutment.

As a result, when the thinner portion of the block is in engagement with the abutment 86, the spring 72 will operate to push the roll upwardly. On the other hand when the wider portion of the wedge engages the abutment 86 the roll will be forced downwardly against the action of the spring.

Stops 85 are positioned at the outer limit of the table travel, and stops 90 at the inner limit; when the table moves out the wedges engage the stops 85 and are moved inwardly permitting the roll to raise; the reverse is true when the table moves in and the wedges engage the stops 90.

In the actual operation of the machine, there is a small amount of extra table movement at the end of the forward or outer stroke and the wedge block is provided with a flat portion 87 so that the ink roll will not be raised any higher and at the same time the strain is taken off the wedge blocks so that they will not act as stops for the table itself.

The purposes of this is to prevent raising of the ink roll to different levels in the event that the speed of table travel is varied and to prevent their functioning as stops which would put a strain on this mechanism.

Figure 5:
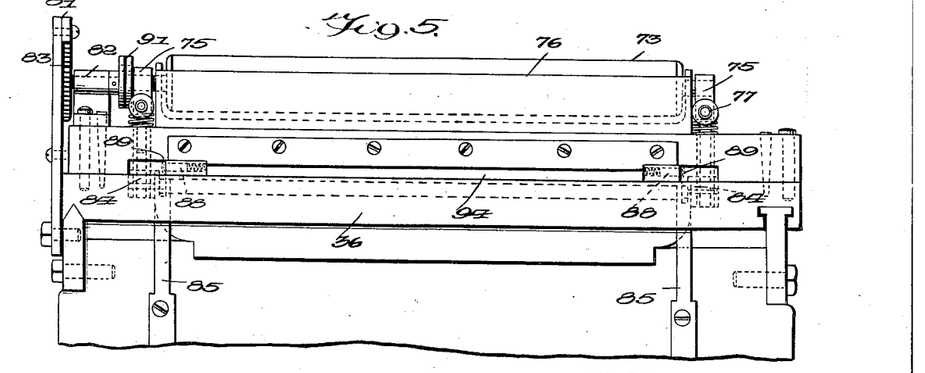
Fig. 5 is a front elevation of the table illustrating the ink applying mechanism.

To prevent the wedge block from jarring to an inoperative position by vibration of the machine or otherwise, there is provided (Fig. 5) a spring pressed pin 88 engaging a spot hole 89 in the wedge block.

The stub shaft 82 is made separate from the roll 73 to afford adjustments therefor, and to accommodate conditions when 82 and 73 are out of line, when the roll moves up and down, and is coupled to the roll by a clutch arrangement 91. This clutch includes two plates, one of which is attached to the ink roll spindle, and provided with a plurality of radially disposed slots 92 any one of which is engageable with a pin 93 on the other plate, the latter plate being affixed to the stub shaft 82 at the end thereof remote from gear 83. With this arrangement, the angular position of the roll may be varied as the roll wears.

A rubber strip 94 is attached to and extends across the table for the purpose of removing or sweeping away any chips that might fall on the striking surface of the machine.

Reference is made particularly to Figs. 2 and 3 in which is illustrated the mechanism for feeding the paper backing material step by step over the surface of the work support and beneath the work placed thereon. To this end there is provided an extension 96 of the main driving shaft 42, upon which is mounted an eccentric made up of two eccentric rings, the outside one of which 97 functions as a paper feed through the connecting rod 98, whose lower end is attached to an arcuate member 99 by means of a stud 100. The arcuate member 99 is pivotally mounted for rotation about a stud 101. A clutch 102 is connected to the arcuate member by means of a link 103, the upper end of which rides on said member. This member has a series of openings or holes 104 which receive a spring mounted pin 105 which can be moved back and forth in a block 106 mounted on the upper end of the rod 103. This pin is actuated by means of a lever 107 pivoted at 108 to the block 106, the lever being slotted where it contacts with the pin 105 to provide necessary lost motion to take care of the relative movement of the pin 105 and the lever 107. The selective connection between the arcuate member 99 and associated parts provides a facile adjustment for varying the feed of the backing material.

A web of paper 109 is supplied in any convenient manner, usually in the form of a roll (not shown) carried at the rear of the frame 31 as shown in Patent No. 1,722,133. From the supply roll the paper passes through the frame, over the support 33, and under the plate 37, then between the guides 68 and back under the support 33 to a feed roller 95 in the base 30. The supporting shaft 110 for the feed roller 95 is aligned with the axis of the one-way clutch 102, and is connected for actuation thereby.

Adjacent the eccentric 97 is an inner eccentric 111 which functions with a brake band 112 pivoted at 113 to the frame 31, of the machine. The surface of the eccentric 111 is eccentric with respect to the driving shaft 96, and the eccentricity is such as to stop the movement of the plunger in its proper position. The inner surface of the brake is lined with brake material, and the braking can be regulated, and adjusted by means of adjusting nuts 114. A block or lug 115 is attached to the frame of the machine and supports a stud 116 which is attached to one end of the brake band 112 by means of an end portion 117.

Figure 7:
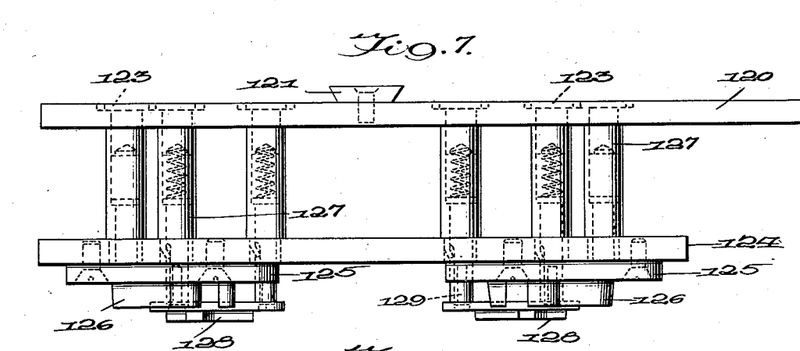
Fig. 7 is an elevation of the die block illustrating one mounting of the cutting and marking dies.
Figure 8:
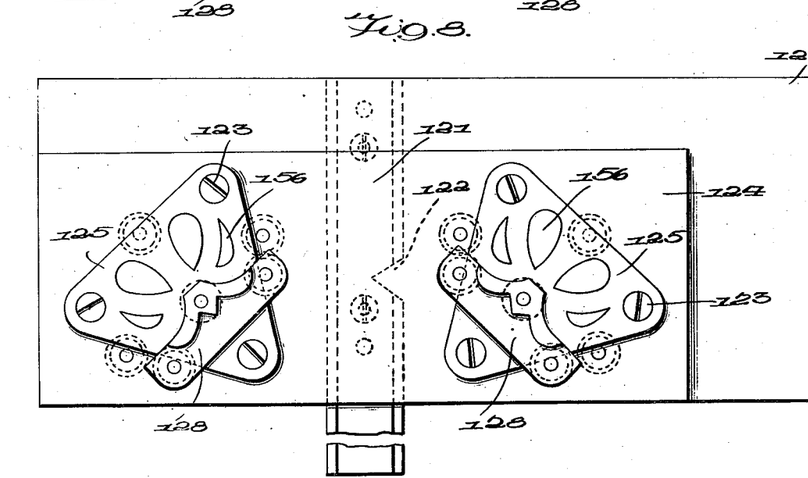
Fig. 8 is a plan view thereof.

Referring now to Figs. 7 and 8, the die unit used in this machine comprises generally a die block 120 which serves as a means of attaching or supporting the several elements going to the make up of a die or dies in the machine, this block being provided with a dove-tailed strip 121 which fits in a corresponding groove in the head of the plunger 40, as illustrated in Fig. 2. Safety mechanism, described in detail in my aforesaid applications cooperates with the member 121 and a V-shaped notch 122 therein to lock the block against removal except under certain operating conditions. Extending from the block 120 are a series of bolts or struts 123 attached to sleeves 127 which serve to carry a lower plate or die base 124 and upon which are mounted cutter blocks 125 carrying cutting units 126 forming a cutting die.

As shown in Fig. 7, a series of sleeves or tubular struts are positioned between said two plates. Marking elements 128 are carried by a series of stems 129, respectively, which are individually slidable in the sleeves, yieldable means being provided to normally position the stems such that the marking edges of the elements 128 are slightly in advance of a plane through the edges of the cutting units.

Figure 9:
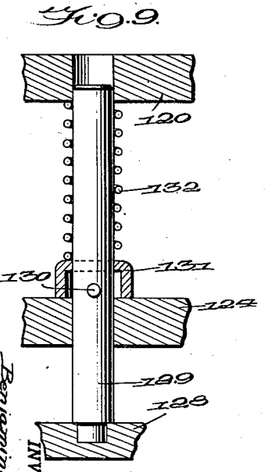
Fig. 9 is an enlarged elevation showing one method of mounting the marking die.
Figure 10:
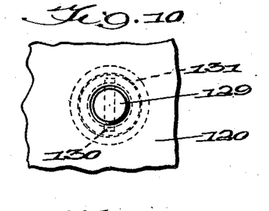
Fig. 10 is a plan view thereof.

Details of several forms of mountings are illustrated in Figs. 9 to 24, in which Figs. 9 and 10 disclose a mounting including a stem 129 connected to the element 128 and slidable in the plates 120 and 124. A pin 130 is enclosed and retained in place by a collar 131, forming a support or shoulder for the spring 132 which has its other end engaged with the block 120. The advantage of this structure resides in the possibility of using a relatively long bearing or stem 129, thereby giving a nice support to the marker, and also permitting use of a long, large spring 132 which is particularly desirable when the marker functions as a stripper, or is used on dies where the stripping action requires considerable pressure.

Figure 11:
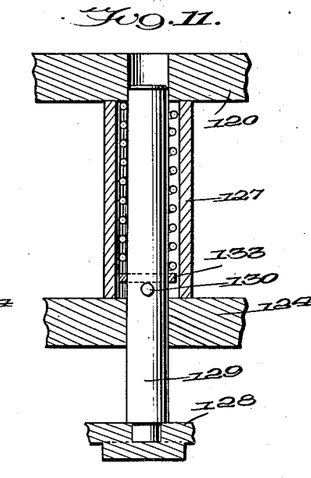
Figs. 11 to 22 are similar views showing various modifications in methods of mounting the marking element.
Figure 12:
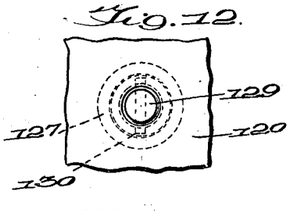

The mounting of Figs. 11 and 12 is offered as a variation, this form utilizing the sleeve 127 and a plate 133 in lieu of the collar 131, the sleeve additionally functioning to prevent chips from collecting at any point, as well as obviating the necessity of separate struts between the plates 120 and 124 which would be necessary if the sleeve were omitted, as in Fig. 9. This style of support offers advantages of assemblage, and protection of the spring, pin, etc., from any possible collection of chips, which might cause an improper functioning of the marker.

Figure 13:
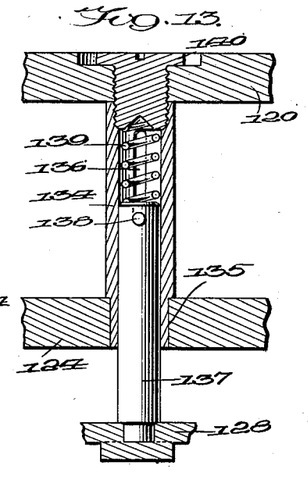
Figure 14:
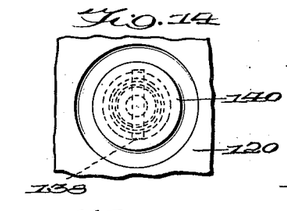

The next development is that shown in Figs. 13 and 14 wherein the tube 134 replaces the element 127, this tube being riveted to the plate 124 at 135 and carrying a slot 136. The stud 137 is somewhat shorter than the stem or stud 129 previously described and carries a pin 138 adjacent the end remote from the marker 128, this pin being adapted to ride in the slot 136. A spring 139 engages the end of the stud and abuts a countersunk screw 140 in the plate 120, the plate and the upper end of the sleeve 134 being threaded to receive such screw. The ease of assemblage of this organization will be apparent, even in the event of breakage of a part.

Figure 15:
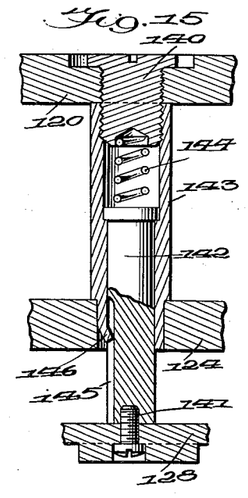
Figure 16:
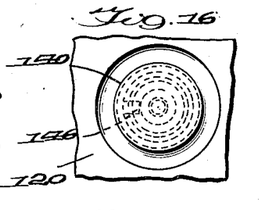

In Figs. 15 and 16 is illustrated still another form wherein the marker is screw threaded, as at 141, to the stem 142 which slides in a sleeve 143 against a spring 144 which abuts the countersunk screw 140. In order to keep the stem or stud 142 from turning when inserting or removing the screw 141, there is provided a slot or keyway 145 in the stem and a finger 146 is struck out from the base of the sleeve 143, to project into and engage such guideway. This construction is very desirable from the standpoint of assemblage and ease of operation, but on dies requiring a great deal of pressure for the purpose of stripping the work difficulties are sometimes encountered and, accordingly, a slight modification of this organization is provided in the construction shown in Figs. 19 and 20. This construction is identical with that of Figs. 15 and 16 except that the screw 147 which is substituted for the previously described screw 140 is countersunk to a much greater depth, thus allowing use of a longer spring.

Figure 21:
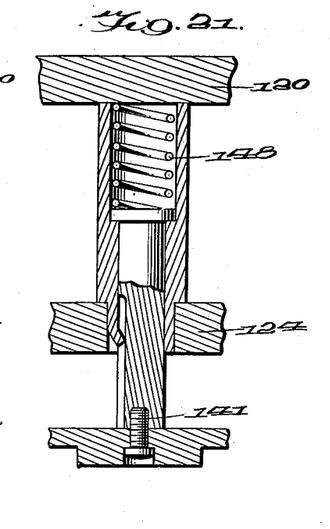
Figure 22:
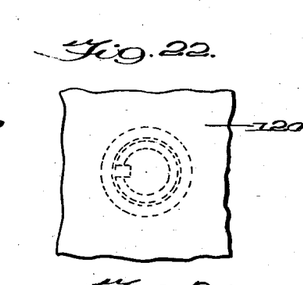

In Figs. 21 and 22 is shown still a further variation of the last two forms described but utilizing a much larger spring 148 in lieu of the spring 139 or 144, and omitting the socketed set screw 140 or 147.

Figures 17, 18, 23, 24:
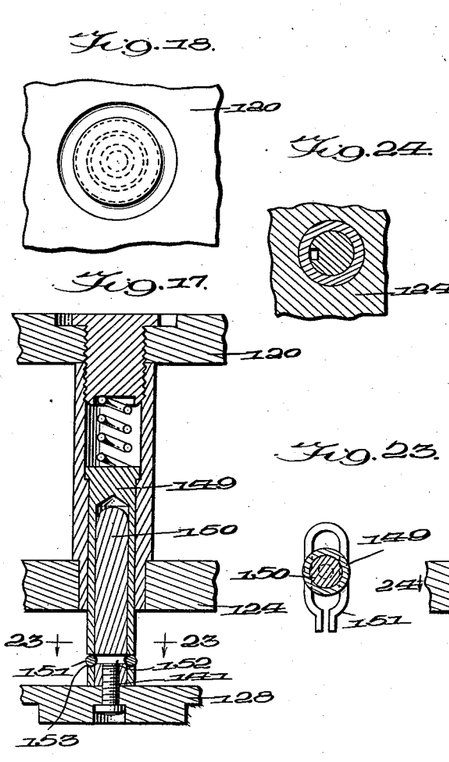
Fig. 23 is a sectional detail taken on line 23—23 of Fig. 17.
Fig. 24 is a section taken on line 24—24 of Fig. 19.
Figure 19:
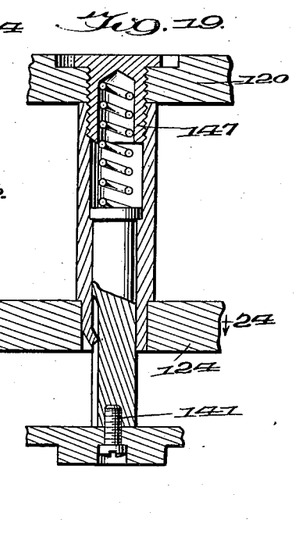
Figure 20:
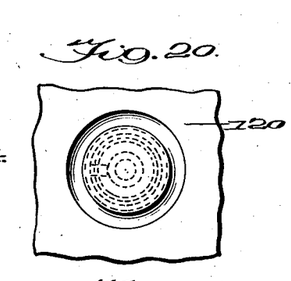

Referring now to Figs. 17 and 18, there will be seen a mounting wherein the stripping and marking element 128 can be detached without removing the screw 141. In this instance the stripper post or stem forming an equivalent of the struts 129, 137 and 142, heretofore described, is made in two parts 149 and 150, the upper part 149 being connected to the lower part 150 by means of a spring coupling 151 which engages a groove 152 in the member 150 through a slot 153 in the member 149. This mounting is likewise quite similar to that shown in Figs. 15 and 16 except that there is no groove or keyway, nor is there any struck up projection for such groove.

In order to protect the operating parts from chips which are cut out from the work, it may be found desirable to provide a chip chute 155 (Fig. 1). The chips will pass through the hollow cutters 156 (Fig. 8) into the chamber between plates 120 and 124, and thence laterally out into the chute 155, for disposition at one side of the machine.

Having thus described my invention, the operation thereof will be readily apparent.

Assuming that the work table 36 is in its outer position, an operator will place a piece of work to be ornamented thereon, gaging same for subsequent alignment with the dies by means of the abutment gage 38. Upon treadling the machine through the rod 56 the table will start inwardly under the influence of the clutch arrangement 52, and the ink roll 73 being in its raised position will begin rotating while the roll 74 distributes ink thereover. As the roll reaches a position adjacent the die, it will contact the edges or projections of the marking element 128 with a rolling motion, thus applying ink evenly thereto. When the table reaches its innermost position the dog 64 will have effected the release of the clutch latch 67 whereupon the clutch 42 will initiate actuation of the plunger 40. The plunger 40 will also have been released by means of the safety mechanism control 70 and will begin to descend toward the work. The marking elements 128 will first engage the work to mark same and, because of the resilient mounting thereof will permit the cutting mechanism to overtake them, passing through or adjacent to the elements and the work will be further ornamented by perforating, the cutting elements going through suitable openings in the plate 37 and into the strip of paper backing material fed immediately thereunder.

The plunger then will begin its upward movement, the table will start to move forwardly and the paper feed will draw the paper a predetermined distance onward. At the time, however, that the table 36 reaches its innermost position the cam wedges 84 will, by engagement with the stops 90, have depressed or drawn down the rolls 73 and 74 so that they will pass the marking element without contact. As soon as the table reaches its outermost position, the cam wedges will abut stops 85 and immediately raise the rolls to their original position and all movement of the table and plunger will stop as both of the main clutches 52 and 43 are of the single revolution type.

By this time the various safety locks and clutch locks will have functioned to lock the machine against further movement until a retreadling thereof.

Having thus described my invention, what I claim as new and desire to secure by Letters Patent of the United States, is:—

1. An ornamenting machine comprising a frame, having a base portion and a head portion, a support on said base portion, a work table mounted for movement on said support; a plunger mounted for movement in said head through a plane normal to said work table, a die unit carried by said plunger including a cutting die, and a marking die resiliently mounted in advance of said cutting die; means carried by said table to apply ink to said marking die during movement of the table, means carried by said table and operative when the table reaches a predetermined position to move said inking means to an inoperative position after an application of ink to the marking die; means to actuate said table and plunger in predetermined synchronous relation, means to guide a strip of backing paper over said support and beneath the table; and means to feed said backing paper automatically and intermittently after each stroke of the plunger.

2. An ornamenting machine comprising a frame, a work support movable thereon, a marking die, a cutting die, and means to provide relative movement between said dies and support whereby a work piece on the support may be ornamented; means movable with said support to apply a marking material to said marking die, means for moving said support on the frame from a work receiving position to a location in alignment with said dies, and means for moving said material applying means into position for engagement with said marking die during movement of said support.

3. An ornamenting machine comprising a frame, a work support movable thereon, a marking die, a cutting die, and means to provide relative movement between said dies and support whereby a work piece on the support may be ornamented; means mounted on said support, for movement therewith to apply a marking material to said marking die, means for moving said support on the frame from a work receiving position to a location in alignment with said dies, said material applying means being so positioned on the support as to contact the marking die during said movement of the support, and means operable in accordance with movements of said support, to move said applying means away from the position where it is adapted to contact the marking die.

4. An ornamenting machine comprising a frame, a work support movable thereon, a marking die, a cutting die, and means to provide relative movement between said dies and support whereby a work piece on the support may be ornamented; means movable with said support to apply a marking material to said marking die, means for moving said support on the frame from a work receiving position to a location in alignment with said marking die at a relatively slow rate of speed, and for returning the support to its original position at an increased rate of speed, means for moving said material applying means into position for engagement with said marking die, during the slow movement, and means for retracting said material applying means to an inoperative position during the rapid movement of said support.

5. An ornamenting machine comprising a frame, a work support movable thereon, a marking die, a cutting die, and means to provide relative movement between said dies and support whereby a work piece on the support may be ornamented; means mounted on said support, for movement therewith, to apply a marking material to said marking die, means for moving said support on the frame from a work receiving position to a location in alignment with said marking die, at a relatively slow rate of speed, and for returning the support to its original position at an increased rate of speed, and means to move said material applying means on the support into position for engagement with the marking die during said slow movement of the support, and to retract said material applying means to an inoperative position during the rapid movement of said support.

6. An ornamenting machine comprising a frame, a work support movable thereon, a marking die, a cutting die, and power actuated means to provide relative movement between said dies and support whereby a work piece on said support may be ornamented; a roll movable with said support to apply a marking material to said marking die, power actuated means for moving said support on the frame from a work receiving position to a location in alignment with said dies, and means for positively rotating said roll during movement of said support.

7. An ornamenting machine comprising a frame, a work support movable thereon, a marking die, a cutting die, and power actuated means to provide relative movement between said dies and support whereby a work piece on said support may be ornamented; a roll movable with said support to apply a marking material to said marking die, power actuated means for moving said support on the frame from a work receiving position to a location in alignment with said dies, means for positively rotating said roll, and means for moving said roll into position for engagement with said dies during movement of said support.

8. An ornamenting machine comprising a frame, a work support movable thereon, a marking die, a cutting die, and means to provide relative movement between said dies and support whereby a work piece on the support may be ornamented; a roll mounted on said support, for movement therewith, to apply a marking material to said marking die, means for moving said support on the frame from a work receiving position to a location in alignment with said dies, and means including a rack bar fixed to said frame and geared to said roll for positively rotating said roll during movement of said support.

9. An ornamenting machine comprising a frame, a work support movable thereon, a marking die, a cutting die, and power actuated means to provide relative movement between said dies and support whereby a work piece on the support may be ornamented; a roll mounted on said support, for movement therewith, to apply a marking material to said marking die, power actuated means for moving said support on the frame from a work receiving position to a location in alignment with said marking die, at a relatively slow rate of speed and for returning the support to its original position at an increased rate of speed, means including a rack bar fixed to said frame and geared to said roll for positively rotating said roll during movement of said support.

10. An ornamenting machine comprising a frame, a work support movable thereon, a marking die, a cutting die, and power actuated means to provide relative movement between said dies and support whereby a work piece on the support may be ornamented; a roll mounted on said support, for movement therewith, to apply a marking material to said marking die, power actuated means for moving said support on the frame from a work receiving position to a location in alignment with said marking die, at a relatively slow rate of speed and for returning the support to its original position at an increased rate of speed, means including a rack bar fixed to said frame and geared to said roll for positively rotating said roll during movement of said support, means for moving said roll into position for engagement with said marking die during the slow movement, and means for retracting said roll to an inoperative position during the rapid or return movement of said support.

11. An ornamenting machine comprising a frame, a work support movable thereon, a marking die, a cutting die, and power actuated means to provide relative movement between said dies and support whereby a work piece on the support may be ornamented; a roll mounted on said support, for movement therewith, to apply a marking material to said marking die, power actuated means for moving said support on the frame from a work receiving position to a location in alignment with said marking die, at a relatively slow rate of speed and for returning the support to its original position at an increased rate of speed, means for moving said roll into engagement with said marking die during the slow movement, means including a rack bar fixed to said frame and geared to said roll for positively rotating said roll during said slow movement, and means for retracting said roll to an inoperative position during the rapid or return movement of said support.

12. An ornamenting machine comprising a frame, a work support movable thereon, a marking die, a cutting die, and means to provide relative movement between said dies and support whereby a work piece on the support may be ornamented; a roll mounted on said support, for movement therewith, to apply a marking material to said marking die, means for moving said support on the frame from a work receiving position to a location in alignment with said dies, means including a rack bar fixed to said frame and geared to said roll for positively rotating said roll during movement of said support, and means between said roll and gearing to provide an angular adjustment of said roll with respect to said gearing.

13. An ornamenting machine comprising a frame, a work support reciprocable thereon, a marking die, a cutting die, and power actuated means to provide relative movement between said dies and support whereby a work piece on said support may be ornamented; a roll mounted on said support, for movement therewith, to apply a marking material to said marking die, means for moving said support on the frame from a work receiving position to a location in alignment with said marking die at a relatively slow rate of speed and for returning the support to its original position at an increased rate of speed, means to depress said roll from the plane of the marking die after an ink applying operation, and for returning the roll to such plane, including a slidable wedge carried by the support in camming engagement with said roll and positioned to abut the frame of the machine at predetermined points in the path of travel of the support.

14. An ornamenting machine comprising a frame, a work support movable thereon, a marking die, a cutting die, and means to provide relative movement between said dies and support whereby a work piece on said support may be ornamented; a roll movable with said support to apply a marking material to said marking die, a supplemental roll mounted in contacting relation with said material applying roll, effective to distribute marking material evenly over the surface of said latter roll, means for moving said support on the frame from a work receiving position to a location in alignment with said dies, and means for rotating said rolls during movement of the support.

15. An ornamenting machine comprising a frame, a work support movable thereon, a marking die, a cutting die, and means to provide relative movement between said dies and support whereby a work piece on said support may be ornamented; a roll movable with said support to apply a marking material to said marking die, means for moving said support on the frame from a work receiving position to a location in alignment with said dies, and means for positively rotating said roll during movement of the support, a supplemental roll mounted in frictionally driven engagement with said material applying roll, and effective to distribute marking material evenly over the surface of said latter roll.

16. An ornamenting machine comprising a frame, a work support movable thereon, a marking die, a cutting die, and means to provide relative movement between said dies and support whereby a work piece on said support may be ornamented; a spring mounted roll carried by said support to apply a marking material to said marking die, means for moving said support on the frame from a work receiving position to a location in alignment with said dies, and means for positively rotating said roll during movement of the support, a spring mounted supplemental roll carried by the support in frictionally driven engagement with said material applying roll, effective to distribute marking material evenly over the surface of said latter roll, and means to adjust the spring mounting of said supplemental roll thereby to vary the degree of friction between the two rolls.

17. An ornamenting machine comprising a frame, a work support movable thereon, a marking die, a cutting die, and means to provide relative movement between said dies and support whereby a work piece on said support may be ornamented; a roll mounted on said support for movement therewith, to apply a marking material to said marking die, said roll having a surface of absorbent material, said support being provided with an open top enclosure for said roll, a supplemental roll mounted in contacting relation with said material applying roll, effective to distribute marking material evenly over the surface of said latter roll, means for moving said support on the frame from a work receiving position to a location in alignment with said dies, and means for rotating said rolls during movement of the support.

18. An ornamenting machine comprising a frame, a work support movable thereon, a combined marking and cutting die unit, and means to move said unit into ornamenting relation with a work piece on the support, means movable with said support to apply a marking material to the marking portion of said unit, means for moving said support on the frame from a work receiving position to a location in alignment with said unit, and means for moving said material applying means relative to said support and into position for engagement with said marking portion during movement of said support.

19. An ornamenting machine comprising a frame, a work support movable thereon, a combined marking and cutting die unit, and means to move said unit into ornamenting relation with a work piece on the support, means movable with said support to apply a marking material to the marking portion of said unit, means for moving said support on the frame from a work receiving position to a location in alignment with said unit, means carried by said support, and movable therewith, for sweeping away waste and foreign matter, and means for moving said material applying means relative to said support and into position for engagement with said marking portion during movement of said support.

20. A die unit for ornamenting machines, comprising a base plate, means on said plate to secure same in a machine, a die block, means connecting said block in spaced relation to said plate, and thereby forming a supporting frame, a cutting element secured to said block, a marking member, a stud secured to said member, means mounting said member for yielding movement relative to said frame including spring means interposed between said block and plate effective normally to locate said stud and member in extended position with respect to said frame, and means limiting movement of said stud and member.

21. A die mounting for ornamenting machines, comprising a support, having spaced walls, means on said support to secure same in a machine, a cutting die on said support, a marking die having a stud mounted for limited yielding movement in said support, means on said stud effective to limit such movement, a spring operatively positioned between said stud and one of the support walls and effective to position the stud and marking die normally in extended relation to the support, and a protective guide sleeve substantially encompassing a portion of the stud within the support.

22. A die mounting for ornamenting machines, comprising a supporting frame having spaced walls, means on one of said walls to secure the frame in a machine, a cutting die on said supporting frame, a marking die having a stud mounted for yielding limited movement in said frame, means on said stud effective to limit such movement, a spring operatively positioned between said stud and a portion of the frame and effective to position the stud and marking die normally in extended relation to the frame, and a protective guide sleeve substantially encompassing said spring and a portion of the stud within the frame, said sleeve extending from wall to wall thereby to provide a strut for the frame.

23. A die mounting for ornamenting machines, comprising a supporting frame having spaced walls, means on one of said walls to secure the frame in a machine, a cutting die on said supporting frame, a marking die having a stud mounted for yielding limited movement in said frame, means on said stud effective to limit such movement, a spring operatively positioned between said stud and a portion of the frame and effective to position the stud and marking die normally in extended relation to the frame, a protective guide sleeve substantially encompassing said spring and a portion of the stud within the frame, said sleeve extending from wall to wall thereby to provide a strut for the frame, said frame portion being removable to facilitate adjustment and assemblage of the mounting.

24. A die mounting for ornamenting machines, comprising a supporting frame having spaced walls, means on one of said walls to secure the frame in a machine, a cutting die on said supporting frame, a marking die having a stud mounted for yielding limited movement in said frame, means on said stud effective to limit such movement, a spring operatively positioned between said stud and a portion of the frame and effective to position the stud and marking die normally in extended relation to the frame, a protective guide sleeve substantially encompassing said spring and a portion of the stud within the frame, said sleeve extending from wall to wall thereby to provide a strut for the frame, said frame portion comprising a socketed screw, threaded into a wall of said frame and an adjacent end of said sleeve, whereby to facilitate adjustment and assemblage of the mounting.

25. A die mounting for ornamenting machines, comprising a supporting frame having spaced walls, means on one of said walls to secure the frame in a machine, a cutting die on said supporting frame, a marking die having a stud mounted for yielding limited movement in said frame, means on said stud effective to limit such movement, a spring operatively positioned between said stud and a portion of the frame and effective to position the stud and marking die normally in extended relation to the frame, and a protective guide sleeve substantially encompassing said spring and a portion of the stud within the frame, said sleeve extending from wall to wall thereby to provide a strut for the frame, and means to prevent relative rotation between said sleeve and stud.

26. A die mounting for ornamenting machines, comprising a supporting frame having spaced walls, means on one of said walls to secure the frame in a machine, a cutting die on said supporting frame, a stud mounted for yielding limited movement in said frame, and having one end extending therefrom, a marking die detachably connected thereto, means on said stud effective to limit such movement, a spring operatively positioned between said stud and a portion of the frame and effective to position the stud and marking die normally in extended relation to the frame, and a protective guide sleeve substantially encompassing said spring and a portion of the stud within the frame, said sleeve extending from wall to wall thereby to provide a strut for the frame, and means to prevent relative rotation between said sleeve and stud.

27. A die mounting for ornamenting machines, comprising a supporting frame having spaced walls, means on one of said walls to secure the frame in a machine, a cutting die on said supporting frame, a marking die having a stud mounted for yielding limited movement in said frame, said stud comprising telescoping sections and means detachably securing said sections together, means on said stud effective to limit such movement, a spring operatively positioned between said stud and a portion of the frame and effective to position the stud and marking die normally in extended relation to the frame, and a protective guide sleeve substantially encompassing said spring and a portion of the stud within the frame, said sleeve extending from wall to wall thereby to provide a strut for the frame.

28. In an ornamenting machine having a frame, a die unit, a work support, power means to provide relative movement between said unit and support whereby to ornament a piece of work on the support, a web of backing material extending across said support and arranged to lie beneath the supported work thereby to insure accurate ornamentation of the work, and means synchronized with said power means to feed said material intermittently over the support thus presenting a fresh surface for each ornamenting operation, comprising an eccentric connected to said moving means, a clutch driven roll for feeding said backing material, and adjustable means operatively connecting said eccentric and said clutch.

29. In an ornamenting machine having a frame, a die unit, a work support, power means to provide relative movement between said unit and support whereby to ornament a piece of work on the support, a web of backing material extending across said support and arranged to lie beneath the supported work thereby to insure accurate ornamentation of the work, and means synchronized with said power means to feed said material intermittently over the support thus presenting a fresh surface for each ornamenting operation, comprising an eccentric connected to said moving means, a clutch driven roll for feeding said backing material, and adjustable means operatively connecting said eccentric and said clutch, said adjustable connecting means including an arcuate lever pivoted to said frame, connecting rods extending respectively from said eccentric and clutch, and means to selectively position and attach said rods to said arcuate lever.

30. In an ornamenting machine having a frame, a die unit, a work support, power means to provide relative movement between said unit and support whereby to ornament a piece of work on the support, a web of backing material extending across said support and arranged to lie beneath the supported work thereby to insure accurate ornamentation of the work, and means synchronized with said power means to feed said material intermittently over the support thus presenting a fresh surface for each ornamenting operation, comprising an eccentric connected to said moving means, a clutch driven roll for feeding said backing material, adjustable means operatively connecting said eccentric and said clutch, and means pivoted to said frame for engagement with said eccentric to brake the machine at a predetermined point in the cycle of operation.

31. An ornamenting machine comprising a frame, having a base portion and a head portion, a support on said base portion, a work table mounted for movement on said support; a plunger mounted for movement in said head through a plane normal to said work table, a die unit carried by said plunger including a cutting die, and a marking die resiliently mounted in advance of said cutting die; means to apply ink to said marking die, means cooperating with said table to move said inking means to an inoperative position after an application of ink to the marking die when the table reaches a predetermined position; means to actuate said table and plunger in predetermined synchronous relation, means to guide a strip of backing paper over said support and beneath the table; and means to feed said backing paper automatically and intermittently after each stroke of the plunger.

32. An ornamenting machine comprising a frame, a work support movable thereon, a marking die, a cutting die, and means to provide relative movement between said dies and support whereby a work piece on the support may be ornamented; means to apply a marking material to said marking die, means for moving said support on the frame from a work receiving position to a location in alignment with said dies at a relatively slow rate of speed, and for returning the support to its original position at an increased rate of speed.

33. An ornamenting machine comprising a frame, a work support movable thereon, a marking die, a cutting die, and means to provide relative movement between said dies and support whereby a work piece on the support may be ornamented; means to apply a marking material to said marking die, means for moving said support on the frame from a work receiving position to a location in alignment with said marking die, at a relatively slow rate of speed, and for returning the support to its original position at an increased rate of speed, and means to move said material applying means into position for engagement with the marking die during said slow movement of the support, and to retract said material applying means to an inoperative position during the rapid movement of said support.

34. An ornamenting machine comprising a frame, a work support movable thereon, a marking and cutting die unit, and means to provide relative movement between said unit and support whereby a work piece on said support may be ornamented; a roll movable with said support to apply a marking material to said unit, means for moving said support on the frame from a work receiving position to a location in alignment with said unit, and means for positively rotating said roll during movement of said support.

35. An ornamenting machine comprising a frame, a work support movable thereon, a marking and cutting die unit, and means to provide relative movement between said unit and support whereby a work piece on said support may be ornamented; a roll movable with said support to apply a marking material to said unit, means for moving said support on the frame from a work receiving position to a location in alignment with said unit, means for positively rotating said roll, and means for moving said roll into position for engagement with said unit during movement of said support.

BENJAMIN W. FREEMAN.